United States Patent [19]

Glaskov et al.

[11] 3,909,130
[45] Sept. 30, 1975

[54] MICROPHOTOCOMPOSING APPARATUS FOR MAKING ARTWORKS

[76] Inventors: Ilya Mikhailovich Glaskov, ulitsa Krasnoarmeiskaya, 8, kv. 21.; Valentin Andreevich Zaitsev, ulitsa Platonova, 19, kv. 22.; Valentin Ivanovich Kuzhelev, ulitsa Kakhovskaya, 38, kv. 53.; Yakov Aronovich Raikhman, ulitsa Pervomaiskaya, 22, korpus 2, kv. 4.; Arnold Petrovich Svidelsky, ulitsa Ya.Kolasa, 88, kv. 45., all of Minsk, U.S.S.R.

[22] Filed: Aug. 24, 1973

[21] Appl. No.: 391,253

[52] U.S. Cl. .................. 355/40; 354/4; 355/46; 355/54
[51] Int. Cl.² .................. G03B 27/52; G03B 27/44; G03B 41/00
[58] Field of Search .............. 354/4; 355/40, 46, 53, 355/54

[56] References Cited
UNITED STATES PATENTS

| | | | |
|---|---|---|---|
| 3,323,414 | 6/1967 | Ritchie et al. .................. | 354/4 |
| 3,641,885 | 2/1972 | Hill .................. | 354/4 |
| 3,648,583 | 3/1972 | Blattner .................. | 354/4 |
| 3,703,858 | 11/1972 | La Canfora .................. | 354/4 |
| 3,704,946 | 12/1972 | Brault et al. .................. | 355/46 |

*Primary Examiner*—Richard A. Wintercorn
*Attorney, Agent, or Firm*—Holman & Stern

[57] ABSTRACT

A microphotocomposing apparatus for making artworks is intended for use in microelectronics. The apparatus comprises a precision coordinatograph for displacing a photographic plate, a high-resolution projecting lens, and a device for forming a pattern in the object plane of the projecting lens. The device for forming the pattern includes two changeable master artworks and a lens disposed intermediate of the master artworks; the lens is used to align the patterns of both master artworks in the object plane of the projecting lens. In operation, a pattern is projected onto the photographic plate which is being displaced, the shape and size of the pattern being varied by a mutual displacement of the master artworks.

4 Claims, 7 Drawing Figures

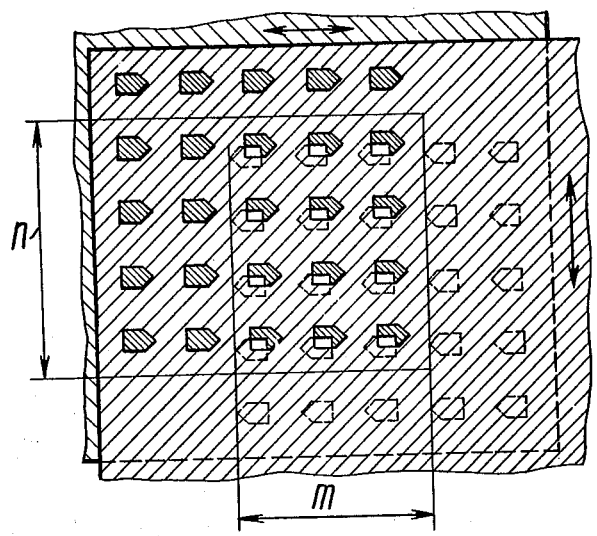
FIG. 2
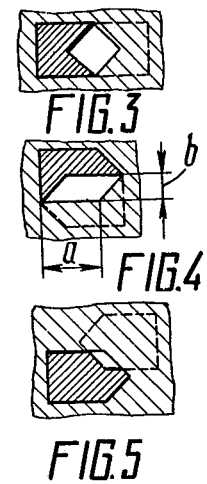
FIG. 3
FIG. 4
FIG. 5
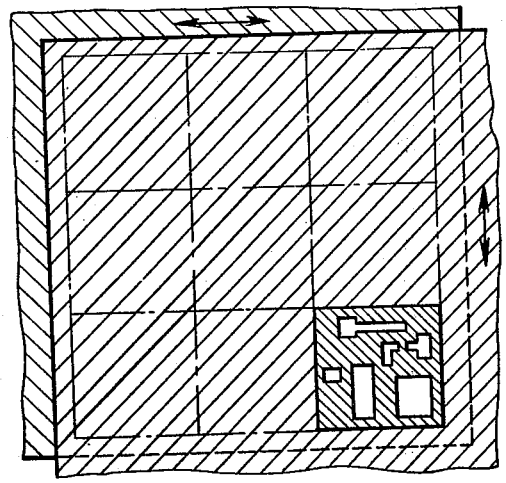
FIG. 6
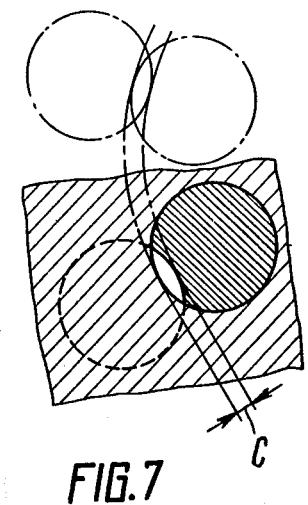
FIG. 7

MICROPHOTOCOMPOSING APPARATUS FOR MAKING ARTWORKS

BACKGROUND OF THE INVENTION

The present invention relates to the art of microelectronics, and more particularly to apparatus for making accurate artworks for use in the manufacture of integrated circuits.

Known in the art are microphotocomposing apparatus (pattern generators) for making accurate artworks, comprising:

a precision coordinatograph on which a photographic plate is moved along coordinate axes in a plane normal to the optical axis of the projecting lens; the position of the coordinatograph is controlled by means of pick-ups sensing the movement of the plate along the coordinate axis;

a composing diaphragm disposed intermediate of a light source and the projecting lens in the object plane of the latter, shaping a rectangular aperture wherethrough a light beam from the light source falls onto the entrance pupil of the projecting lens; the rectangular aperture being defined by the edges of four sliding shutters (or 2 sliding and 2 fixed shutters) and the shape and size of the aperture being variable according to the position of the shutters; the edges of the rectangular aperture are parallel to the coordinate axes, therefore to project certain slanting elements and lines of the layout, provision is made in some apparatus for rotating the composing diaphragm through 180° with a discrete interval of 1°, the displacement of the shutters and rotation of the diaphragm are effected by means of step-by-step motors or DC motors with pick-ups sensing the angle of rotation of the motor, and controlled by means of a control system;

a high-resolution projecting lens to project the pattern of the rectangular aperture of the composing diaphragm onto the light-sensitive layer of the photographic plate with a slight reduction to provide for a better accuracy of the pattern elements being projected;

a high-quality optical system with a powerful light source;

a control system ensuring automatic operation of the apparatus according to programs fed from magnetic or paper tapes, punched cards, or a memory device.

The prior-art microphotocomposing apparatus operates as follows. The coordinatograph with a photographic plate placed thereon is manually set to the initial position. The control system is fed with a program carrying information on the size and layout of the printed-circuit elements to be projected. At the initial stage, the control system zeroes the counters of the coordinatograph displacement pick-ups and reads out the data from the program on a single or a number of successive exposures.

The coordinatograph is set to the required position, while the composing diaphragm selects the right size of the rectangular aperture. Exposure is achieved by switching on the flash light, or actuating the shutter when a continuous-glow light source is used.

The coordinatograph is then set to the next position, the rectangular aperture of the composing diaphragm is readjusted, if necessary, and another exposure is effected. The process is repeated step by step until the entire topological layout of the artwork is transferred to the photographic plate through the exposure of the latter to light.

A major disadvantage inherent in the prior-art apparatus resides in that the exposure of the topological layout is effected consecutively only by one element. This accounts for the process of making artworks for big-size integrated circuits being time-consuming, which results in an additional cost and adversely affects accuracy because during the long period of time which it takes to make an artwork, the ambient conditions may change (for example, the temperature of the air in the room where the apparatus is installed) or time-varying temperature fluctuations may occur in different components of the apparatus due to heat-evolution caused by the light source, operation of the motors, friction, etc.

Additionally, the prior art microphotocomposing apparatus fail to reproduce elements of circular and other non-rectangular shapes, as well as certain portions of the topological layout from intermediate artworks, because they are devoid of mechanisms or pick-ups sensing the orientation of an intermediate artwork relative to the axis of the projection lens and to the coordinate axes of the coordinatograph.

SUMMARY OF THE INVENTION

The prior-art microphotocomposing apparatus also fail to reproduce curvilinear patterns.

It is an object of the present invention to provide a microphotocomposing apparatus for making artworks, which minimizes the time required to produce artworks.

Another object of the invention is to provide a microphotocomposing apparatus for making artworks, which enables the range of configurations of topological layouts on artworks to be extended.

Still another object of the invention is to provide a microphotocomposing apparatus for making artworks with high accuracy.

These and other objects are attained in a microphotocomposing apparatus for making artworks, comprising a photographic plate adapted to be displaced in two mutually perpendicular directions in the plane thereof, a projecting lens, a light source, and means for forming a pattern in the object plane of the projecting lens, which pattern is projected onto the photographic plate, the means for forming a pattern in the object plane of the projecting lens includes, according to the invention, two master artworks disposed intermediate of the projecting lens and the light source, adapted to be displaced relative to each other and the patterns thereof being aligned in the object plane of the projecting lens so that the pattern obtained as a result of alighing said patterns of both master artworks is projected onto the photographic plate.

The microphotocomposing apparatus of the invention significantly reduces the time required to produce artworks, enhances their accuracy and extends the range of topological layouts of the artworks.

It is expedient that the apparatus be provided with a control system coupled to drives enabling the master artworks to be displaced relative to each other.

The control system of the herein-disclosed apparatus has high reliability and is capable of making highly complex artworks, In an alternative embodiment of the present invention, the means for forming a pattern in the object plane of the projecting lens includes lens placed intermediate of the two master artworks, one artwork being disposed in the object plane of the projecting lens and the other artwork being disposed in the object plane of the lens of said means, so that the pattern of the second master artwork is transferred by this lens to the plane of the pattern of the first master artwork.

The use of a lens in the pattern-forming means makes it possible to accurately align the patterns of both master artworks in the object plane of the projection lens, thus ensuring high quality of the artworks being produced.

In still another embodiment, the master artworks may be provided, to transfer groups of similar elements to the photographic plate, with a pattern in the form of screens with similar transparent polygons whose arrangement determines the layout of the periodically repeated elements in the artworks being produced.

The employment of master artworks in the form of screens makes it possible to transfer a plurality of elements to the photographic plate, thus minimizing the time required to produce artworks.

A method is also disclosed for transferring to the photographic plate curves and lines inclined to the direction of displacement of the plate by means of the herein-disclosed apparatus in which the master artworks bear, according to the invention, patterns in the form of transparent circles which are so aligned that projected onto the photographic plate is a slot formed by the segments of two circles, the width of the slot determining the thickness of the line being reproduced, and the master artworks and the photographic plate are continuously moved so that the major axis of symmetry of the slot is always in line with the direction in which the photographic plate is displaced.

The use of master artworks with round windows makes it possible to reproduce curvilinear elements, which substantially broadens the scope of manufacturing integrated circuits.

The invention, in one of its embodiments, may be provided, to produce composite artworks, with one master artwork having a set of standard topological layouts and the other master artwork having a rectangular transparent section which enables any one of the patterns to be projected onto the photographic plate.

The use of master artworks with sets of standard topological layouts minimizes the time required to produce artworks.

BRIEF DESCRIPTION OF THE DRAWING

Additional objects and features of the invention will become apparent from the following description in which a preferred embodiment is set forth to be read in conjunction with the accompanying drawings, wherein:

FIG. 2 shows the position of two master artworks for a group photocomposition, according to the invention;

FIGS. 3, 4 and 5 show schematically the formation of screen elements with slanting sides, according to the invention;

FIG. 6 shows the selection of a topological layout portion when the master artworks are aligned, according to the invention; and FIG. 7 shows the reproduction of a curve on an artwork.

DETAILED DESCRIPTION OF PREFERRED EMBODIMENTS

Figure 1:
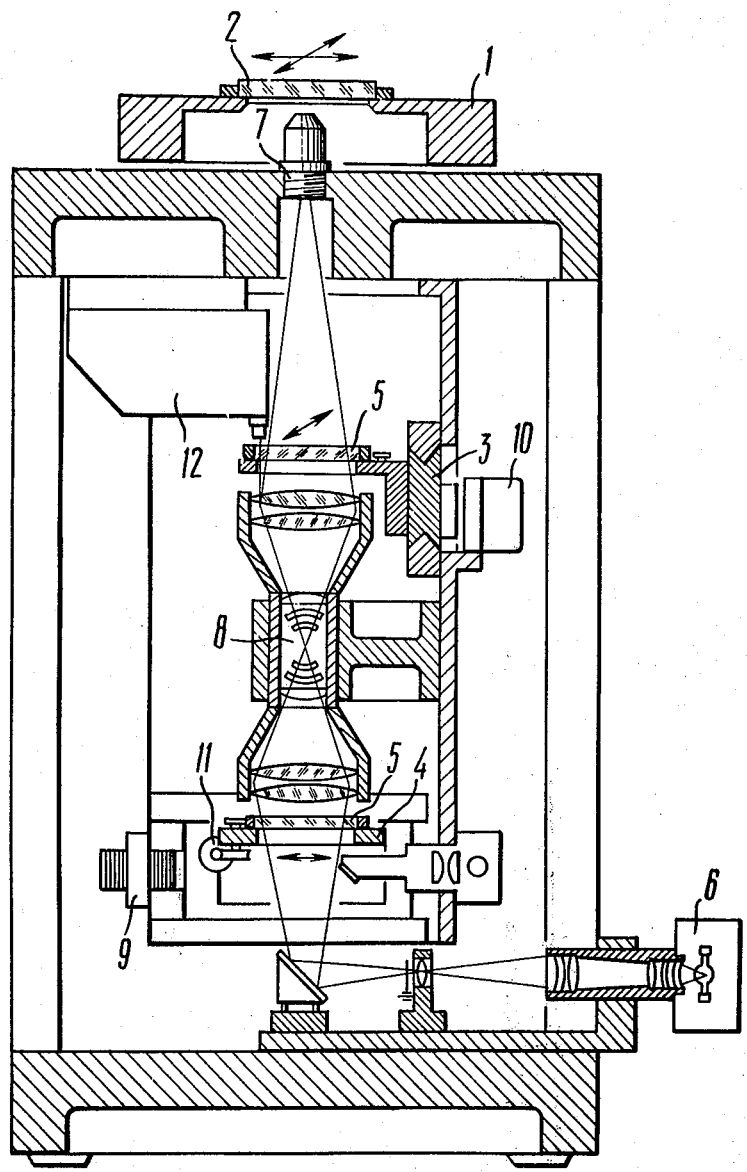
FIG. 1 is an elevation view of a microphotocomposing apparatus, according to the invention.

The microphotocomposing apparatus of the invention differs from those known in the art in that instead of a composing diaphragm with sliding shutters use is made of a means comprising two carriages each accommodating a master artwork, which master artworks are thus adapted to be displaced in two mutually perpendicular directions in planes parallel to the plane in which the photographic plate is displaced, and are spaced a certain distance apart with a lens being disposed intermediate thereof, which lens aligns the pattern of one master artwork with that of the other in the object plane of the projecting lens. Thus, a pattern is formed in the plane of the photographic plate through the alignment of the patterns of both master artworks. The displacement of each carriage is controlled by linear movement pick-ups. To ensure accurate initial orientation of the master artworks relative to the axis of the projecting lens and to the X and Y axes of the coordinatograph, the master artworks are provided with orientation marks, and mounted on each carriage are two drives orienting the master artworks angularly and in a direction normal to that of displacement of the respective carriage actuated by signals from an orientation pick-up fixed on the base board of the coordinatograph in direct proximity to the projecting lens.

To form groups of similar pattern elements, the master artworks are made in the form of screens with similar polygonal (or rectangular) elements.

To produce pattern elements of non-rectangular shapes or composite artworks, the master artwork of one of the carriages represents a set of pattern elements or topological layout portions, while the master artwork of the other carriage is provided with a window confining a pattern portion. To obtain slanting curves, the master artworks have round transparent windows.

Referring now to FIG. 1, the microphotocomposing apparatus comprises a precision coordinatograph 1 with a recess receiving a photographic plate 2 and two carriages 3 and 4 with changeable master artworks 5 disposed intermediate of a light source 6 and a projecting lens 7. The master artwork 5 of the carriage 3 lies in the object plane of the projecting lens 7, and a lens 8 brings the pattern of the master artwork 5 of the carriage 4 to the same plane. Thus, the projecting lens 7 projects the pattern formed by both master artworks onto the photographic plate 2.

Each of the carriages 3 and 4 is provided with a drive 9 ensuring accurate displacement of the carriages and having a pick-up 10 of linear movement on diffraction gratings, as well as drives 11 orienting the changeable master artwork 5 angularly and in a direction normal to that of displacement of the carriage.

The basic position of the changeable master artworks 5 relative to the optical axis of the projecting lens 7 and to the directions of displacement of the coordinatograph 1 is controlled by a fixed photoelectric sensor 12 orienting the master artworks 5 by the orientation marks on the latter.

Automatic operation of the apparatus is ensured by a control system incorporating an electronic computer.

The microphotocomposing apparatus operates as follows.

To produce single artworks in a conventional manner, the changeable master artworks 5 of both carriages 3 and 4 each have a rectangular or a polygonal pattern element. The size of these patterns may be varied, if necessary, and made as big as the working field of the lens 7 in the object plane, because the distance through which the carriages 3 and 4 are displaced exceeds to some extent the size of the working field of the lens 7 in the object plane, and the required accuracy of displacement is ensured by the linear movement pick-ups 10 throughout the working travel of the carriages 3 and 4. By displacing the carriage 3 along one coordinate and the carriage 4 along the other, the right size of the element being composed can be selected, and by displacing the coordinatograph 1 relative to the optical axis of the projecting lens 7, the right portion of the photographic plate 2 is exposed.

To produce complex artworks for big-size integrated circuits, placed on the carriages 3 and 4 are the master artworks 5 having screens with a plurality of polygons (FIG. 2). The polygons of the screen are arranged on the master artworks 5 with a spacing equal to the product of the spacings between periodically repeated elements of the artworks being made by the reduction ratio of the projecting lens 7 or an integral number of times greater than this product if the same screens are used to produce artworks with different spacings between repeated pattern elements, which number is a multiple of the minimum spacing between the latter. In this case, the minimum spacing between pattern elements of the artwork being produced is obtained by respectively displacing the coordinatograph 1 and by additional exposures. For example, if by means of a screen on the master artwork it is possible to reproduce pattern elements arranged along a coordinate with a spacing of 100 m$\mu$, by displacing the coordinatograph along the same coordinate through 50 m$\mu$ and by exposing other portions of the photographic plate 2, it then becomes possible to reproduce elements spaced at 50 m$\mu$.

The carriages 3 and 4 are each displaced along a respective coordinate through a distance less than one spacing on the screen to select sizes $a$ and $b$ (FIG. 4) of each individual pattern element, and when the carriages 3 and 4 are displaced through a distance equal to one or more spacings on the screen, the limits of a pattern portion projected onto the photographic plate 2 are defined, which portion has sizes $m$ and $n$ determining the number of individual pattern elements being reproduced on each coordinate.

Consider now the composition of groups of pattern elements.

To produce composite artwork, placed on the carriage 3 is a master artwork 5 with portions of topological layouts (FIG. 6), while placed on the carriage 4 is another master artwork 5 with a discriminating (transparent) rectangular window of such a size that it confines only one layout portion. The topological layout portions are arranged on one of the master artworks 5 so as to form vertical and horizontal rows, while the discriminating rectangular window of the other master artwork 5 is in the corner of the working section. One of the carriages 3 and 4 is displaced to select a horizontal row, and the other carriage is displaced to select a vertical row, which rows form a topographical layout portion to be reproduced.

At the same time, the coordinatograph 1 is set to a position in which the layout portion on the master artwork is aligned with the required portion of the photographic plate 2.

To reproduce lines inclined relative to the direction of displacement of the coordinatograph 1, master artworks 5 with round transparent windows (FIG. 7), are placed on the carriages 3 and 4 and the carriages are set, in response to commands from the control system, to such a postion that the major axis of symmetry of the slot formed when the windows are superimposed, is in line with the direction in which the coordinatograph 1 is displaced, size $c$ determining the width of the lines being reproduced. Exposure is effected with the coordinatograph 1 being continuously displaced along a preset path.

To reproduce curvilinear elements, the coordinatograph 1 and the carriages 3 and 4 are displaced in a correlated manner so that the position of the coordinatograph 1 at each instant determines the trajectory of the line being reproduced, whereas the position of the carriages 3 and 4 provides for the alignment of the major axis of symmetry of the slot with the direction in which the coordinatograph 1 is displaced.

The radius of the round windows determines the minimum radius of curvature of the lines being reproduced, as well as their maximum width.

What is claimed is:

1. A microphotocomposing apparatus for making artworks, comprising: a photographic plate displaceable in two mutually perpendicular directions in its own plane; a projecting lens; a light source operatively associated with said projecting lens; means for forming a pattern in the object plane of said projecting lens, which pattern is projected onto said photographic plate, including two mutually displaceable master artworks disposed intermediate of said light source and said projecting lens, the patterns thereof being aligned in the object plane of said projecting lens so that a pattern obtained as a result of aligning the patterns of both master artworks is projected onto said photographic plate, said means for forming a pattern in the object plane of said projecting lens including an intermediate lens disposed intermediate of said master artworks, a first of said two master artworks being in the object plane of said projecting lens and a second of said master artworks being in the object plane of said intermediate lens so that the pattern of said second master artwork is transferred by said intermediate lens to the plane of the pattern of said first master artwork.

2. A microphotocomposing apparatus as claimed in claim 1, wherein, to reproduce groups of similar pattern elements on said photographic plate, both said master artworks have patterns in the form of screens with similar transparent polygons, the arrangement whereof determines the pattern of periodically repeated elements on the artworks being produced.

3. A method of reproducing curves and lines inclined to the direction of displacement of a photographic plate, using an apparatus comprising: a photographic plate displaceable in two mutually perpendicular directions in its own plane; a projecting lens; a light source operatively associated with said projecting lens; means for forming a pattern in the object plane of said projecting lens, which pattern is projected onto said photographic plate, including two mutually displaceable master artworks disposed intermediate of said light source and said projecting lens, the patterns thereof being aligned in the object plane of said projecting lens so that a pattern obtained as a result of aligning the patterns of both master artworks is projected onto said photographic plate, said method comprising the steps of: employing a pair of master artworks each having patterns in the form of transparent circles; aligning said master artworks so that projected on the photographic plate is a slot formed by the segments of two circles, the width of the slot determining the thickness of the line being reproduced; and continuously displacing the master artworks and the photographic plate so that the major axis of symmetry of the slot is always in line with the direction in which the photographic plate is displaced.

4. A microphotocomposing apparatus for making artworks, comprising: a photographic plate displaceable in two mutually perpendicular directions in its own plane; a projecting lens; a light source operatively associated with said projecting lens; means for forming a pattern in the object plane of said projecting lens, which pattern is projected onto said photographic plate, including two mutually displaceable master artworks disposed intermediate of said light source and said projecting lens, the patterns thereof being aligned in the object plane of said projecting lens so that a pattern obtained as a result of aligning the patterns of both master artworks is projected onto said photographic plate, wherein to produce a composite artwork, one of said master artworks has a set of standard topological layouts, and the other of said master artworks is provided with a rectangular transparent window through which any of said patterns may be projected onto said photographic plate.

* * * * *